Patented Dec. 28, 1926.

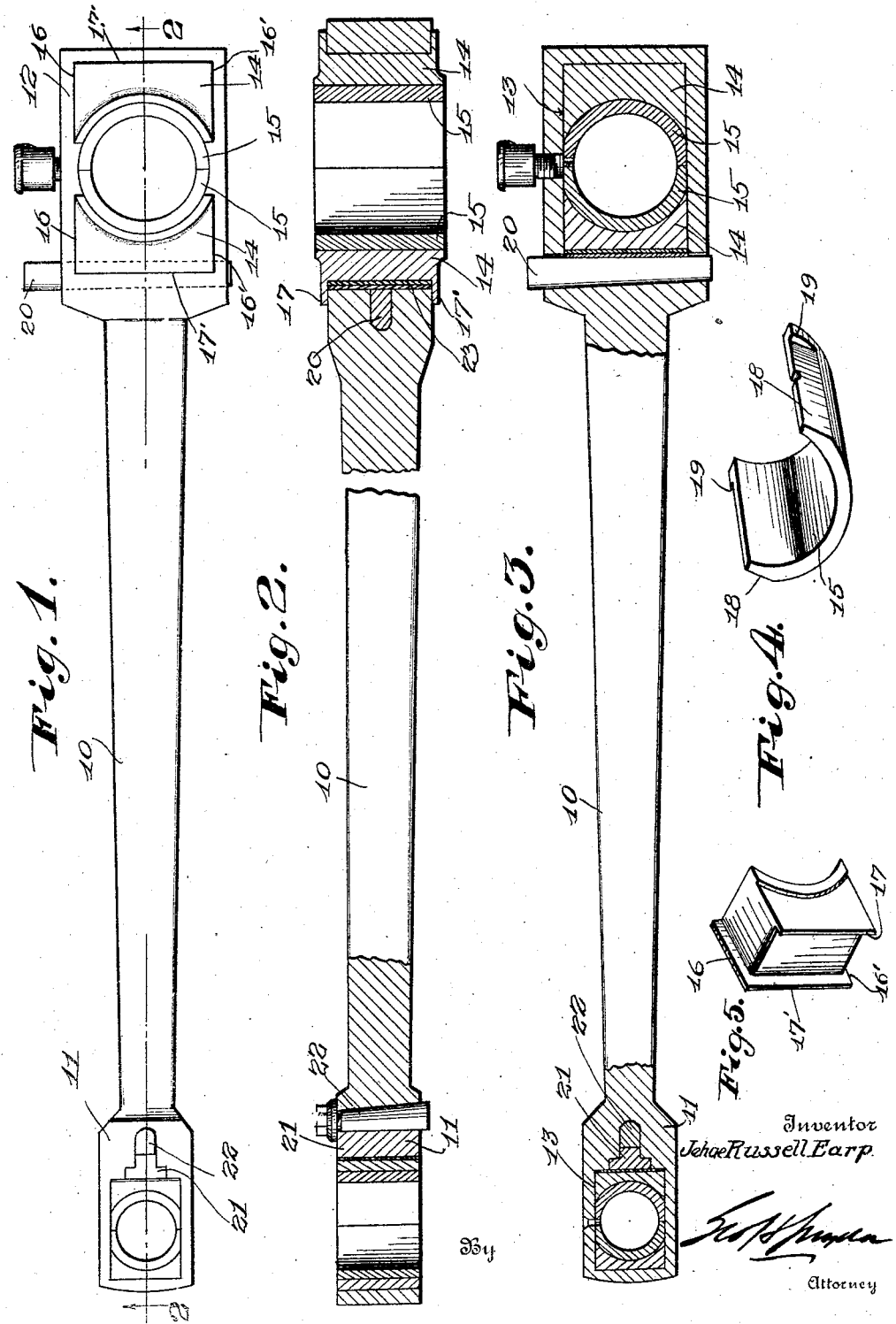

1,612,619

UNITED STATES PATENT OFFICE.

JEHUE RUSSELL EARP, OF CHATTANOOGA, TENNESSEE.

MAIN ROD.

Application filed September 11, 1924. Serial No. 737,180. Renewed May 25, 1926.

This invention relates to connecting rods, and has special reference to bearings for connecting rod ends.

One important object of the invention is to improve the general construction of connecting rod ends.

A second important object of the invention is to provide an improved form of connecting rod end wherein the brasses will be constructed in two parts so arranged that they will be capable of being taken up in the event of wear.

A third important object of the invention is the provision of an improved connecting rod end having bearing blocks and liners or brasses especially constructed to permit ready removal and the taking up of wear on the brasses.

With the above and other objects in view as will be hereinafter described, the invention consists in general of certain novel details of construction and combinations of parts hereinafter more fully described, illustrated in the accompanying drawings and specifically claimed.

In the accompanying drawings like characters of reference indicate like parts in the several views, and:

Fig. 1 is a side elevation of a connecting rod constructed in accordance with this invention.

Fig. 2 is an enlarged section on the line 2—2 thereof.

Fig. 3 is a view similar to Fig. 1, but with the ends shown in vertical section.

Fig. 4 is a perspective view of one of the improved liners or brasses.

Fig. 5 is a perspective view of one of the bearing blocks.

This invention is shown in connection with a main rod having a body 10, a cross head end 11, and a crank end 12. Each of these ends is provided with a transversely extending rectangular opening 13 in which are fitted the bearing blocks 14 and the brasses or liners 15. Each bearing block is provided at one side with a peripheral flange 16 which projects from the top, a bottom 16' and rear flange 17', while the other side of the bearing block is provided with a similar flange 17 projecting only from the rear face. At the other end the bearing blocks are made without flanges.

Similarly the crank pin brasses consist of semi-circular body portions having flat terminal faces 18 which rest against the sides of the openings 13. At the crank pin end these flat terminal faces are provided with similar flanges 19 projecting from one side of the boss so that, when inserted, it is held from moving in one direction through the connecting rod.

At the crank end there is also provided the usual key 20, and between this key and the adjacent bearing block may be placed liners 23 which serve to take up the wear on the brasses as the latter takes place, the additional liners being inserted, from time to time as may be found necessary. At the other end there is provided the usual gib 21 and key 22. Thus, under this construction it is at all times easy to compensate for wear on the liners and to replace the latter when too greatly worn.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is wished to include all such as properly come within the scope claimed.

Having thus described the invention, what is claimed as new, is:

In combination with a connecting rod having a closed strap end, a pair of bearing blocks in said end having confronting hollow segmento-cylindrical faces, said bearing blocks being provided on one side with a peripheral flange extending from the top, bottom and rear faces, and on the other side with a flange extending from the rear faces only, a pair of liners of substantially semi-circular form and having flattened portions adjacent the ends of the semi-circles to bear against the top and bottom of the connecting rod strap whereby to prevent rotation of the liner in the bearing blocks, and said liners having short flanges at one end extending from the flattened portions, the said flanges being the width of the flattened portions only and the remainder of the liner being free from flanges.

In testimony whereof I affix my signature.

J. HUE RUSSELL EARP.